US012466653B2

(12) United States Patent
Zhang

(10) Patent No.: US 12,466,653 B2
(45) Date of Patent: Nov. 11, 2025

(54) METHOD FOR LOCATING A WAREHOUSING ROBOT, A METHOD OF CONSTRUCTING A MAP, ROBOT AND STORAGE MEDIUM

(71) Applicant: LINGDONG TECHNOLOGY (BEIJING) CO. LTD., Beijing (CN)

(72) Inventor: Guangpeng Zhang, Beijing (CN)

(73) Assignee: LINGDONG TECHNOLOGY (BEIJING) CO. LTD., Beijing (CN)

( * ) Notice: Subject to any disclaimer, the term of this patent is extended or adjusted under 35 U.S.C. 154(b) by 514 days.

(21) Appl. No.: 18/026,105

(22) PCT Filed: Jul. 30, 2021

(86) PCT No.: PCT/CN2021/109692
§ 371 (c)(1),
(2) Date: Mar. 13, 2023

(87) PCT Pub. No.: WO2022/052660
PCT Pub. Date: Mar. 17, 2022

(65) Prior Publication Data
US 2023/0331485 A1    Oct. 19, 2023

(30) Foreign Application Priority Data
Sep. 14, 2020   (CN) .......................... 202010963415.4

(51) Int. Cl.
*B65G 1/137*    (2006.01)
(52) U.S. Cl.
CPC .................. *B65G 1/1375* (2013.01)
(58) Field of Classification Search
CPC .................................................. B65G 1/1375
See application file for complete search history.

(56) References Cited

U.S. PATENT DOCUMENTS 9,908,702 B2 *   3/2018   Elazary ............... B65G 1/1375
12,415,277 B2 *  9/2025   Zhong .................. G05D 1/2462
(Continued)

FOREIGN PATENT DOCUMENTS

CN    107103069 A    8/2017
CN    107328420 A    11/2017
(Continued)

OTHER PUBLICATIONS

The Office Action of the corresponding CN Patent Application No. 202010963415.4 issued on Apr. 12, 2022 along with English translation thereof.
(Continued)

*Primary Examiner* — Kyle O Logan
(74) *Attorney, Agent, or Firm* — NZ Carr Law Office

(57) ABSTRACT

Disclosed are a method for locating a warehousing robot, a method for constructing a map, a robot and a storage medium. In a specific embodiment, a semantic map of a warehouse environment is constructed in advance, and the semantic map comprises a plurality of objects existing in the warehouse environment and semantic information of the objects. In the localization process, a warehousing robot uses its own image sensor to acquire an image or video data of a surrounding environment (11), identifies target objects in the image or video data and semantic information of the target objects (12) to obtain the relative position relationship between each target object and the warehousing robot (13), and then determines the location of the warehousing robot in the semantic map based on the relative position relationship and the semantic information of each target object (14). The method for constructing a map is based on visual semantic localization. Because the method directly detects specific targets, the detection speed is fast, semantic information is rich, and the method is not easily influenced by other (Continued)

interference factors. The method gets rid of the dependence on signs in the warehouse environment and has high localization flexibility.

15 Claims, 4 Drawing Sheets

(56) References Cited

U.S. PATENT DOCUMENTS

| | | | |
|---|---|---|---|
| 2017/0029213 A1* | 2/2017 | Johnson | G06Q 10/087 |
| 2018/0150693 A1* | 5/2018 | Guo | G06V 20/46 |
| 2018/0336421 A1* | 11/2018 | Huang | G05D 1/0274 |
| 2019/0171220 A1 | 6/2019 | Elazary et al. | |
| 2019/0188473 A1* | 6/2019 | Witt | G06V 20/64 |
| 2019/0188477 A1* | 6/2019 | Mair | G06T 7/70 |
| 2019/0250627 A1* | 8/2019 | Witt | G01C 21/206 |
| 2019/0265722 A1 | 8/2019 | Haeusler et al. | |
| 2019/0278292 A1* | 9/2019 | Levinson | G01S 13/89 |
| 2022/0362939 A1* | 11/2022 | Zhong | G06V 20/35 |

FOREIGN PATENT DOCUMENTS

| | | |
|---|---|---|
| CN | 109084749 A | 12/2018 |
| CN | 110147095 A | 8/2019 |
| CN | 110532978 A | 12/2019 |
| CN | 111486855 A | 8/2020 |
| CN | 112161618 A | 1/2021 |
| JP | 2019125345 A | 7/2019 |
| JP | 2019523925 A | 8/2019 |
| WO | 2017090108 A1 | 6/2017 |

OTHER PUBLICATIONS

The Office Action of the corresponding CN Patent Application No. 202010963415.4 issued on Oct. 9, 2022 along with English translation thereof.

The international search report of the corresponding PCT Application No. PCT/CN2021/109692 mailed on Nov. 3, 2021 along with English translation thereof.

(ISA/237) Written Opinion of the International Searching Authority dated Nov. 3, 2021.

The Office Action of the corresponding JP Patent Application No. 2023516646 issued on Jan. 30, 2024.

* cited by examiner

Intersecting lines between shelves and ground plane

Intersections formed by shelves

METHOD FOR LOCATING A WAREHOUSING ROBOT, A METHOD OF CONSTRUCTING A MAP, ROBOT AND STORAGE MEDIUM

CROSS REFERENCE TO RELATED APPLICATIONS

This application refers to Chinese Patent Application No. 2020109634154, filed on Sep. 14, 2020, entitled "Warehousing Robot Localization and Mapping Method, Robot and Storage Medium", the entire contents of which are hereby incorporated by reference.

TECHNICAL FIELD

The application relates to the technical field of warehousing robots, in particular to a method for locating a warehousing robot, a method for constructing a map, a robot and a storage medium.

BACKGROUND

The development of artificial intelligence leads to the advent of logistics and warehousing robots. Logistics and warehousing robots generally work in a warehouse environment, which is often complicated due to many shelves and objects stacked on the ground. In order to assist the warehousing robot with localization, signs like reflective strips and two-dimensional codes are set in the warehouse environment. During mapping, the warehousing robot traverses the warehouse environment, uses the technology of simultaneous localization and mapping (SLAM) to construct an environmental map, and marks the positions of the signs on the environmental map. During localization, the warehousing robot deduces its position in the environmental map by detecting the position relationship between the signs and a robot body in combination with the positions of the signs on the environmental map. Existing warehouse localization methods require pre-arrangement of signs in the warehouse environment, and are highly dependent on the signs, resulting in poor localization flexibility.

SUMMARY

Various aspects of the application provide a warehousing robot localization and mapping method, a robot and a storage medium, which are used for getting rid of dependence on signs in a warehouse environment.

An embodiment of the application provides a method for locating a warehousing robot, which comprises: acquiring an image or video data of a surrounding warehouse environment by using an image sensor on a warehousing robot during movement of the warehousing robot; performing target detection and semantic recognition on the image or video data of the surrounding warehouse environment to obtain target objects in the surrounding warehouse environment and semantic information of the target objects; calculating a relative position relationship between each target object and the warehousing robot based on a transformation relationship between a sensor coordinate system and a robot coordinate system; and determining a location of the warehousing robot in a semantic map according to the relative position relationship between each target object and the warehousing robot and the semantic information of each target object, wherein the semantic map comprises a plurality of objects in the warehouse environment and semantic information of the objects.

An embodiment of the application further provides a method for constructing a semantic map, which comprises: acquiring an image or video data of a warehouse environment by using an image sensor on a warehousing robot during process of the warehousing robot traversing the warehouse environment; performing target detection and semantic recognition on the image or video data of the warehouse environment to obtain a plurality of objects existing in the warehouse environment and semantic information of the objects; calculating relative position relationships between the plurality of objects and the warehousing robot respectively based on a transformation relationship between a sensor coordinate system and a robot coordinate system; and adding the semantic information of the plurality of objects to a basic environmental map according to the relative position relationships between the plurality of objects and the warehousing robot and a location of the warehousing robot in the basic environmental map when acquiring the image or video data of the warehouse environment, so as to obtain the semantic map of the warehouse environment.

An embodiment of the application further provides a warehousing robot, which comprises a device body including a memory for storing computer programs, and a processor coupled to the memory and used for executing the computer programs to; acquire an image or video data of a surrounding warehouse environment by using an image sensor on the warehousing robot during movement of the warehousing robot; perform target detection and semantic recognition on the image or video data of the surrounding warehouse environment to obtain target objects in the surrounding warehouse environment and semantic information of the target objects; calculate a relative position relationship between each target object and the warehousing robot based on the transformation relationship between a sensor coordinate system and a robot coordinate system; and determine a location of the warehousing robot in a semantic map according to the relative position relationship between each target object and the warehousing robot and the semantic information of each target object, wherein the semantic map comprises a plurality of objects in the warehouse environment and semantic information of the objects.

An embodiment of the application further provides a computer-readable storage medium storing computer programs, which, when executed by a processor, cause the processor to implement the steps in any one of the method for locating the warehousing robot and the method for constructing the semantic map in the embodiments of the application.

In the embodiments of the application, a semantic map of a warehouse environment is constructed in advance, and the semantic map comprises a plurality of objects existing in the warehouse environment and semantic information of the objects. In the localization process, a warehousing robot uses its own image sensor to acquire an image or video data of a surrounding environment, identifies target objects in the image or video data and semantic information of the target objects to obtain the relative position relationship between each target object and the warehousing robot, and then determines the location of the warehousing robot in the semantic map based on the relative position relationship and the semantic information of each target object. The method is based on visual semantic localization. Because the method directly detects specific targets, the detection speed is fast, semantic information is rich, and the method is not easily influenced by other interference factors. The method gets rid of the dependence on signs in the warehouse environment and has high localization flexibility.

BRIEF DESCRIPTION OF THE DRAWINGS

The drawings described herein are used to provide a further understanding of the application and constitute a part of the application. The illustrative embodiments and descriptions of the application are used to explain the application, and do not constitute an improper limitation of the application. In the drawings.

DETAILED DESCRIPTION OF EMBODIMENTS

In order to make the purpose, technical scheme and advantages of the application clearer, the technical scheme of the application will be clearly and completely described below in combination with specific embodiments of the application and corresponding drawings. Obviously, the described embodiments are part of the embodiments of the application, not all of them. Based on the embodiments of the application, all other embodiments obtained by those of ordinary skill in the art without making creative labor belong to the scope of protection of the application.

Aiming at the problem of poor localization flexibility caused by strong dependence on signs in the prior art, in the embodiments of the application, a semantic map of a warehouse environment is constructed in advance, and the semantic map comprises a plurality of objects existing in the warehouse environment and semantic information of the objects. In the localization process, a warehousing robot uses its own image sensor to acquire an image or video data of a surrounding environment, identifies target objects in the image or video data and semantic information of the target objects to obtain the relative position relationship between each target object and the warehousing robot, and then determines the location of the warehousing robot in the semantic map based on the relative position relationship and the semantic information of each target object. The method is based on visual semantic localization. Because the method directly detects specific targets, the detection speed is fast, semantic information is rich, and the method is not easily influenced by other interference factors. The method gets rid of the dependence on signs in the warehouse environment and has high localization flexibility.

The technical scheme provided by each embodiment of the application will be described in detail below in combination with attached drawings.

Figure 1A:
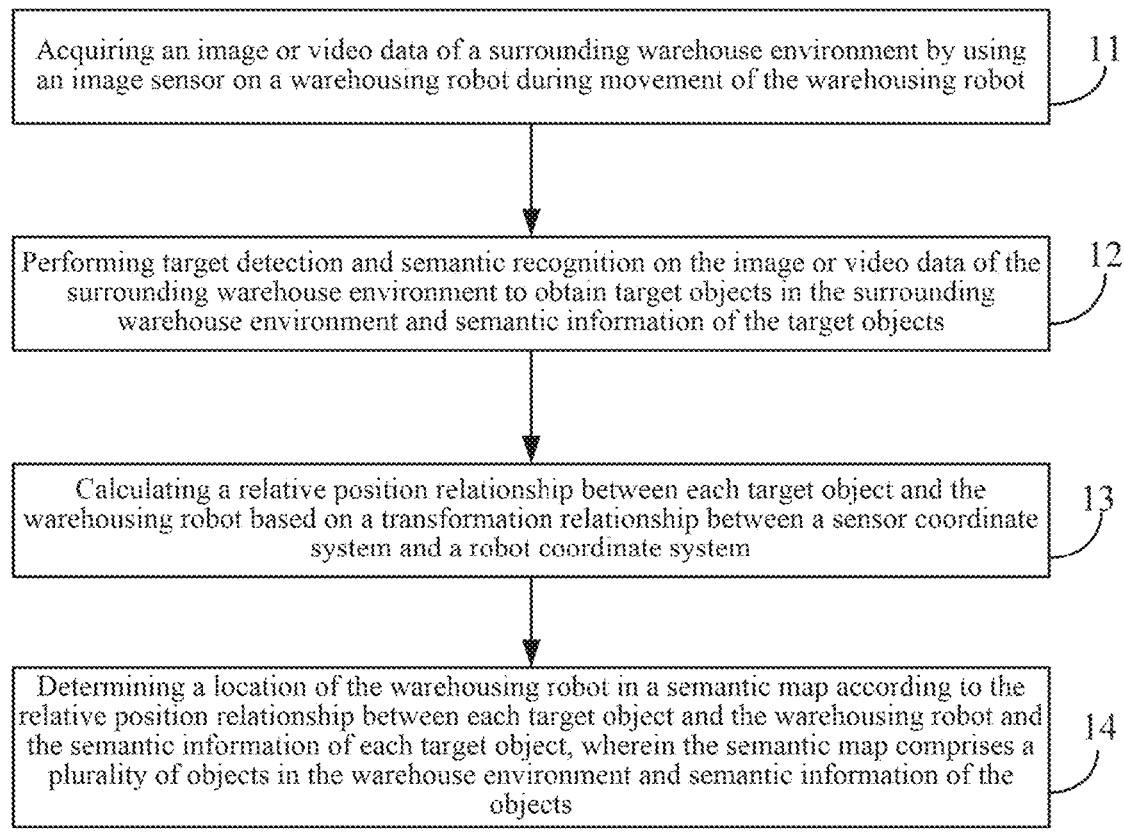
FIG. 1a is a flowchart of a method for locating a warehousing robot provided by an exemplary embodiment of the application.

FIG. 1a is a flowchart of a method for locating a warehousing robot provided by an exemplary embodiment of the application. As shown in FIG. 1a, the method comprises:

11. acquiring an image or video data of a surrounding warehouse environment by using an image sensor on a warehousing robot during movement of the warehousing robot;

12. performing target detection and semantic recognition on the image or video data of the surrounding warehouse environment to obtain target objects in the surrounding warehouse environment and semantic information of the target objects;

13. calculating a relative position relationship between each target object and the warehousing robot based on a transformation relationship between a sensor coordinate system and a robot coordinate system; and 14. determining a location of the warehousing robot in a semantic map according to the relative position relationship between each target object and the warehousing robot and the semantic information of each target object, wherein the semantic map comprises a plurality of objects in the warehouse environment and semantic information of the objects.

Figure 1B:
FIG. 1b is a diagram of a shelf in a warehouse environment provided by an exemplary embodiment of the application.
Figure 1C:
FIG. 1c is a diagram of an intersecting line between a shelf and a ground plane in a warehouse environment provided by an exemplary embodiment of the application.
Figure 1D:
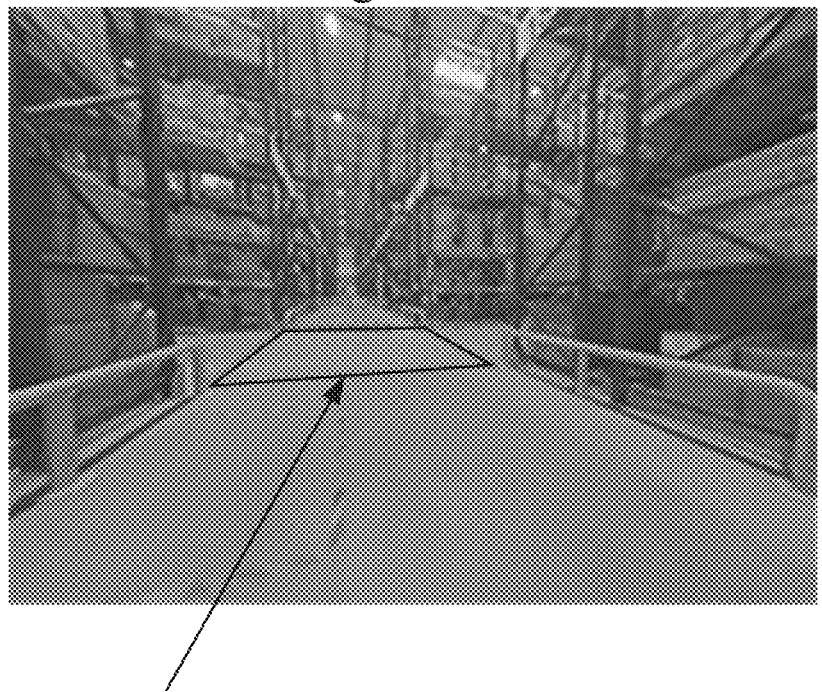
FIG. 1d is a diagram of an intersection formed by shelves in a warehouse environment provided by an exemplary embodiment of the application.

In this embodiment, the warehouse environment refers to a place where goods are stored, for example, it may be a warehouse, a freight house or a storehouse. A warehouse environment generally comprises a plurality of objects such as stored goods, a plurality of shelves for storing goods, intersecting lines between the shelves and a ground plane, and intersections formed by the shelves, as shown in FIGS. 1b-1d, and may further comprise at least one of shelf bases, fire hydrants and escape signs.

In this embodiment, the warehousing robot refers to a mechanical device that works in a warehouse environment and is capable of highly autokinetic movement in the space of the warehouse environment, for example, a warehouse cooperative robot, a picking robot or a handling robot. The warehousing robot comprises a device body, which contains a control unit and a chassis structure. The chassis is a load-bearing part of the warehousing robot, and the chassis structure comprises a bottom plate, a driving wheel assembly and a driven wheel assembly. The control unit can control the driving wheel assembly to drive the driven wheel assembly to move in the warehouse environment. In addition, the warehousing robot may also comprise human-computer interaction parts such as a display screen and/or an audio assembly, and with these parts, users can send control instructions to the warehousing robot, or provide the warehousing robot with data about goods, orders, handling locations, or the like, so as to assist the warehousing robot with storage operation. Further, the warehousing robot may also comprise an image sensor for acquiring image or video data of the surrounding warehouse environment of the warehousing robot. In this embodiment, the image sensor is not limited, and any image sensor that can acquire the image or video data of the surrounding warehouse environment of the warehousing robot is applicable to this embodiment. For example, the image sensor may be, but is not limited to, a monocular camera, a binocular camera or a Red Green Blue Depth map (RGBD) camera. Further, the warehousing robot may also be provided with other sensors, such as at least one of a laser sensor, an odometer, and an inertial measurement unit (IMU), which are used to acquire the surrounding environment information, motion data and/or attitude data of the warehousing robot, so as to assist the warehousing robot with localization.

In this embodiment, the warehouse environment where the warehousing robot is located corresponds to a semantic map, which refers to an environmental map containing semantic information of a plurality of objects in the warehouse environment. The semantic information of an object refers to information that can help understand and explain what the object is or the type of the object by means of natural language, such as but not limited to a name, a shape and a location of the object. Compared with an existing non-semantic environmental map, the semantic map has a higher semantic level, which facilitates the localization of the warehousing robot, improves the user experience and meets the requirement of people for semantic maps. In this embodiment, the warehousing robot can realize visual semantic localization based on the semantic map. The process of constructing a semantic map can be seen in the following embodiment shown in FIG. 3, and will not be described in detail here.

Figure 1E:
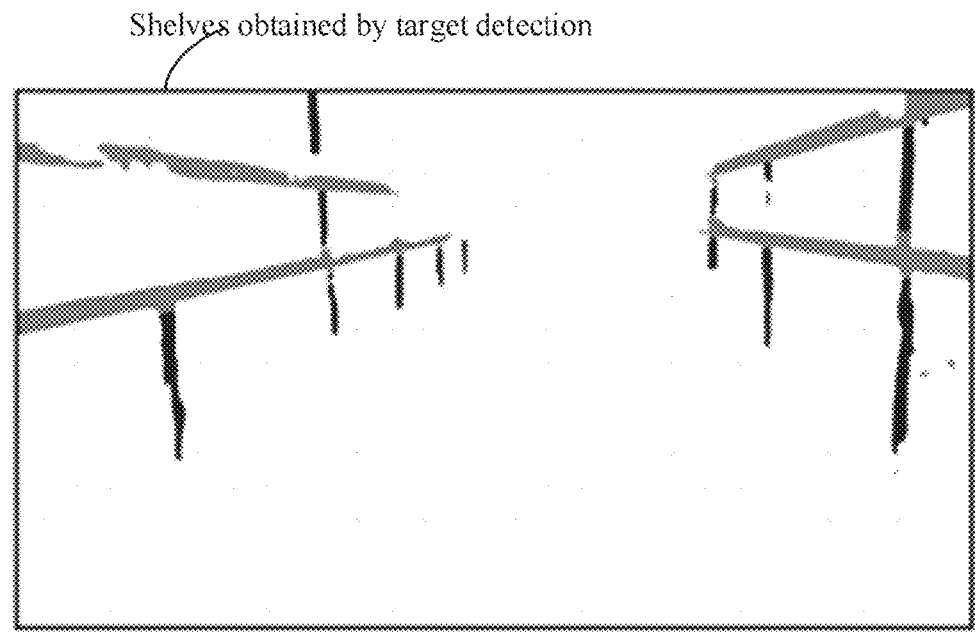
FIG. 1e is a diagram of a shelf obtained by target detection provided by an exemplary embodiment of the application.

The warehousing robot moves in the warehouse environment. During the movement, the image sensor can acquire the image or video data of the surrounding warehouse environment of the warehousing robot, as shown in FIGS. 1b-1d. The surrounding warehouse environment refers to part of the warehouse environment near the warehousing robot. The range of the image or video data that can be acquired by the warehousing robot in the surrounding warehouse environment is related to the field of view of the image sensor. The larger the field of view of the image sensor, the larger the range of the image or video data it acquires. After acquiring the image or video data of the surrounding warehouse environment, target detection and semantic recognition can be performed on the image or video data of the surrounding warehouse environment, so as to obtain objects in the surrounding warehouse environment of the warehousing robot and semantic information of the objects. Taking the image data shown in FIG. 1b as an example, the detected objects contained in the image data are shown in FIG. 1e. Further, after the objects are recognized, semantic recognition is performed to obtain the semantic information of the object, such as shelves. There is a plurality of objects in the whole warehouse environment. In order to distinguish and describe them easily, the objects in the surrounding warehouse environment of the warehousing robot acquired during the localization process are called target objects. In this embodiment, the semantic information of the object is identified by visual semantic technology, that is, the method directly detects specific targets, the detection speed is fast, semantic information is rich, and the method is not easily influenced by other interference factors. The method provides a foundation for warehousing robot localization to get rid of the dependence on signs in the warehouse environment, and improves the localization flexibility.

In this embodiment, the implementation of target detection and semantic recognition performed on the image and video data of the warehouse environment is not limited, for example, a target detection model can be used to perform target detection and semantic recognition on the image or video data. The target detection model can have the functions of target detection and semantic recognition at the same time, so as to not only identify the objects contained in the warehouse environment and locations of the objects, but also perform semantic recognition on the detected objects to obtain the visual semantic information of the objects. All models with both target detection function and semantic recognition function are applicable to the target detection model of the embodiment of the application. For example, it may be a region-based target detection model, such as Region-Convolutional Neural Networks (R-CNN) or Fast Region-Convolutional Neural Networks (Fast-R-CNN), or a regression-based target detection model, such as You Only Look Once (YOLO) model or Single Shot MultiBox Detector (SSD), or the like, which is not limited.

After the semantic information of the target object is obtained, the location of the target object in the semantic map can be determined in combination with the semantic map of the warehouse environment. If the relative position relationship between the target object and the warehousing robot is known, the location of the warehousing robot in the semantic map can be determined based on the semantic information of the target object. On this basis, in this embodiment, after the image sensor acquires the image or video data of the surrounding warehouse environment, the position coordinates of the target object can be calculated, and then the relative position relationship between the target object and the warehousing robot can be calculated based on the position coordinates of the target object. Here, the image sensor is installed on the warehousing robot, and the image sensor uses a sensor coordinate system; alternatively, if the image sensor is a camera, the sensor coordinate system can be called a camera coordinate system. The warehousing robot uses a robot coordinate system, and a transformation relationship exists between the two coordinate systems. The image and video data of the surrounding warehouse environment of the warehousing robot acquired by the image sensor belong to the sensor coordinate system, that is, the position coordinates of the target object identified by the target detection model belong to the sensor coordinate system. On this basis, in order to obtain the relative position relationship between the target object and the warehousing robot, the position coordinates of the target object can be transformed to the robot coordinate system based on the transformation relationship between the sensor coordinate system and the robot coordinate system, so as to calculate the relative position relationship between the target object and the warehousing robot. Specifically, the process comprises: calculating A three-dimensional coordinates of pixels on the target object in the sensor coordinate system; transforming the three-dimensional coordinates of the pixels on the target object from the sensor coordinate system to the robot coordinate system based on the transformation relationship between the sensor coordinate system and the robot coordinate system; and calculating the relative position relationship between the target object and the warehousing robot according to the three-dimensional coordinates of the pixels on the target object in the robot coordinate system. Here, the image sensor is located on the warehousing robot, and the installation position of the image sensor relative to the warehousing robot is certain and knowable, so the transformation relationship between the sensor coordinate system and the robot coordinate system can be calculated in advance according to the installation position of the image sensor relative to the warehousing robot.

The transformation relationship between the sensor coordinate system and the robot coordinate system can be obtained by using a rotation matrix R1 and a translation vector T1 as follows:

$$\begin{bmatrix} X_R \\ Y_R \\ Z_R \\ 1 \end{bmatrix} = \begin{bmatrix} R1 & T1 \\ \vec{0} & 1 \end{bmatrix} \begin{bmatrix} X_C \\ Y_C \\ Z_C \\ 1 \end{bmatrix}$$

where ($X_R$, $Y_R$, $Z_R$, 1) is a point in the robot coordinate system, $\vec{0}$=(0,0,0), R1 is a 3×3 matrix, T1 is a 3×1 matrix, and ($X_C$, $Y_C$, $Z_C$, 1) is a point in the sensor coordinate system. The rotation matrix R1 and translation vector T1 are related to the installation position of the image sensor on the warehousing robot, and the rotation matrix R1 and translation vector T1 can be calculated in advance under the condition that the installation position of the image sensor on the warehousing robot is determined. It should be noted that the way of calculating the three-dimensional coordinates of the pixels on the target object in the sensor coordinate system varies with image sensors, which can be seen in the exemplary description of the subsequent embodiments.

Further, after the relative position relationship between each target object and the warehousing robot is obtained, the location of the warehousing robot in the semantic map can be determined according to the relative position relationship between each target object and the warehousing robot and the semantic information of each target object.

In the embodiments of the application, the semantic map of the warehouse environment is constructed in advance, and the semantic map comprises a plurality of objects existing in the warehouse environment and the semantic information of the objects. In the localization process, the warehousing robot uses its own image sensor to acquire the image or video data of the surrounding environment, identifies target objects in the image or video data and the semantic information of the target objects to obtain the relative position relationship between each target object and the warehousing robot, and then determines the location of the warehousing robot in the semantic map based on the relative position relationship and the semantic information of each target object. The method is based on visual semantic localization. Because the method directly detects specific targets, the detection speed is fast, semantic information is rich, and the method is not easily influenced by other interference factors. The method gets rid of the dependence on signs in the warehouse environment and has high localization flexibility.

In the following embodiment, the implementations of calculating the three-dimensional coordinates of the pixels on the target object in the sensor coordinate system will be described by assuming that the image sensor is a monocular camera, a binocular camera or an RGBD camera.

Implementation A1: The image sensor on the warehousing robot is a monocular camera. The monocular camera acquires the image or video data of the surrounding warehouse environment of the warehousing robot. The image or video data comprise some target objects that intersect with the ground plane, such as intersecting lines between shelves and the ground plane, and also comprise some target objects that are located on the ground plane, such as intersections formed by shelves on the ground plane, which may be T-junctions or crossroads. In this case, the three-dimensional coordinates, on the ground plane, of each pixel intersecting the ground plane on the target object can be calculated in combination with a photographic geometry of the monocular camera, and the three-dimensional coordinates are position coordinates in the sensor coordinate system.

Figure 2:
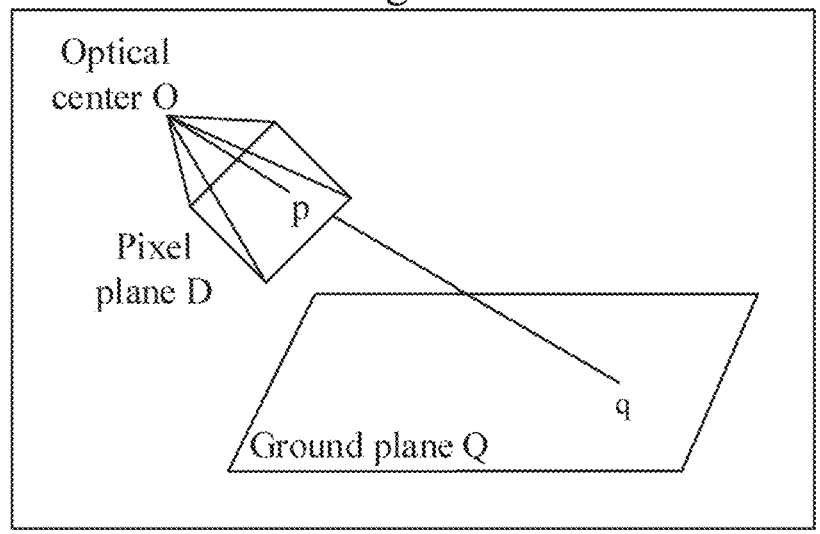
FIG. 2 is a diagram of the position relationship between a pixel plane of a monocular camera and a ground plane provided by an exemplary embodiment of the application.

As shown in FIG. 2, it is assumed that O is an optical center of the monocular camera, D is a pixel plane of the monocular camera, and Q is the ground plane. In the image or video data acquired by the monocular camera, each pixel p corresponds to a ray passing through the pixel plane D from the optical center O, and the ray Op intersects the ground plane Q at a point q. The way of calculating the three-dimensional coordinates, on the ground plane, of the pixel intersecting the ground plane on the target object, that is, the way of calculating the three-dimensional coordinates of the point q, depends on the internal parameters and external parameters of the monocular camera, the internal parameters of the monocular camera are parameters related to the characteristics of the monocular camera itself, such as the focal length and pixel size of the monocular camera, and the external parameters of the monocular camera refer to the position, rotation direction or the like of the camera.

Assuming that the external parameters of the ground plane Q relative to the monocular camera are a rotation matrix R and a translation matrix T, the normal vector (0,0,1) of the ground plane is transformed into the normal vector $R*(0,0,1)^T$ in the camera coordinate system through the rotation matrix R, and assuming that $R*(0,0,1)^T$ is (a,b,c), the plane equation ax+by+cz+d=0 of the ground plane in the camera coordinate system can be obtained, and then the three-dimensional coordinates of the intersection point q between the ray Op and the ground plane in the camera coordinate system can be calculated.

Implementation A2: The image sensor on the warehousing robot is a binocular camera. When acquiring the images of the warehouse environment, the binocular camera can capture a left viewpoint image and a right viewpoint image of the same scene. A disparity map of the two viewpoint images can be obtained by using a binocular stereo matching algorithm, and then a depth map can be obtained. Based on the depth map, the three-dimensional coordinates of the pixels on the target object in the camera coordinate system can be obtained.

Implementation A3: The image sensor on the warehousing robot is an RGBD camera. When acquiring the images of the warehouse environment, the RGBD camera can capture a depth image and an RGB image of the same scene, so as to directly obtain the three-dimensional coordinates of the pixels on the target object in the camera coordinate system by means of the matching relationship between the RGB image and the depth image.

Besides the image sensor, the warehousing robot may also comprise a depth sensor, which can acquire a depth image of the warehouse environment. The warehousing robot can combine the image information acquired by the image sensor with the depth information acquired by the depth sensor to obtain the three-dimensional coordinates of the target object in the image.

For any of the above implementations, after obtaining the three-dimensional coordinates of the pixels on the target object in the sensor coordinate system, the three-dimensional coordinates of the pixels on the target object in the sensor coordinate system can be transformed to the robot coordinate system based on the transformation relationship between the sensor coordinate system and the robot coordinate system; and according to the three-dimensional coordinates of the pixels on the target object in the robot coordinate system, the relative position relationship between the target object and the warehousing robot is calculated.

In the embodiment of the application, after obtaining the semantic information of the target object and the relative position relationship between the target object and the warehousing robot, the location of the target object in the semantic map can be determined according to the semantic information of the target object; and according to the relative position relationship between the target object and the warehousing robot and the location of the target object in the semantic map, the location of the warehousing robot in the semantic map is determined.

In some application scenarios, although there is a plurality of objects in the whole warehouse environment, the semantic information of the plurality of objects is different. Or, in the process of constructing a semantic map, each object can have distinct semantic information by finely distinguishing the semantic information. For example, the semanteme of a shelf can be defined by brand, specification, model, color, or the like, so that different shelves have different semantic information, and in this way, the semantic map comprises a plurality of objects with different semantic information. In this case, the location of the target object in the semantic map can be determined directly according to the semantic information of the target object.

Of course, in other application scenarios, there will be many similar shelves in the warehouse environment, and these shelves may all be marked as shelves in the semantic map, so it is impossible to directly determine which shelf the warehousing robot is near simply based on the semantic information of the shelves. In this case, in order to determine which shelf the warehousing robot is near, the warehousing robot can be roughly located first, then based on the result of rough localization, which shelf the warehousing robot is near is determined, and then the warehousing robot is finely located in combination with the location of this shelf. Of course, in addition to many similar shelves, there may be many similar intersections, shelf bases, fire hydrants, escape signs and other objects in the warehouse environment, which can be treated in the same or similar way. On this basis, in some alternative embodiments, the implementation of determining the location of the target object in the semantic map according to the semantic information of the target object comprises: calculating an initial location of the warehousing robot in the semantic map based on other sensor data on the warehousing robot; and searching for the location of the target object around the initial location in the semantic map according to the semantic information of the target object. After determining the location of the target object in the semantic map, the location of the warehousing robot in the semantic map can be determined based on the relative position relationship between the target object and the warehousing robot. Here, the target object around the initial location may be an object closest to the initial location and having identified semantic information, or an object having the identified semantic information within a certain range from the initial location.

Alternatively, other sensor data may be at least one of laser sensor data, IMU data and odometer data. Some implementations of calculating the initial location of the warehousing robot in the semantic map according to other sensor data will be described below.

Implementation B1: The warehousing robot is further equipped with a laser sensor. During the movement of the warehousing robot, the laser sensor can also acquire surrounding environmental information, and the acquired environmental information is called laser sensor data. In combination with the laser sensor data, the warehousing robot can determine the initial location of the warehousing robot in a constructed basic environmental map, that is, the SLAM initial localization process. Here, the basic environmental map may be constructed by the warehousing robot in advance using the SLAM technology.

In Implementation B1, the SLAM technology is used to initially locate the warehousing robot first, and then secondary accurate localization is performed in combination with visual semanteme, which reduces the requirement for the accuracy of the initial location of the warehousing robot, so fewer sensor data can be used in the process of determining the initial location of the warehousing robot by using the laser sensor, so as to improve the localization efficiency and save computing resources. In addition, by means of visual semantic localization, the problem of poor localization accuracy caused by the missing of acquired features and the lack of obvious or sufficient hierarchical information in the process of SLAM localization can be solved, so that the localization accuracy is ensured.

For Implementations B2 and B3 below, it is assumed that the location of the warehousing robot in the semantic map is known at the beginning of movement, and the changes of the posture and orientation angle of the warehousing robot can be measured by other sensors, so that the initial location of the warehousing robot in the semantic map can be obtained based on the location of the warehousing robot in the semantic map at the beginning of movement and the changes of the posture and orientation angle of the warehousing robot.

Implementation B2: The warehousing robot is further equipped with an IMU, and during the movement of the warehousing robot, the IMU can acquire the motion and/or attitude data of the warehousing robot, which are referred to as IMU data for short. The IMU contains a three-axis accelerometer and a three-axis gyroscope, wherein the accelerometer is used to output the acceleration information of the warehousing robot in the directions of the three coordinate axes in the robot coordinate system, and the gyroscope is used to output the angular velocity information of the warehousing robot relative to the directions of the three coordinate axes in the robot coordinate system. According to the angular velocity and acceleration information of the warehousing robot in the robot three-dimensional coordinate system, the changes of the posture and orientation angle of the warehousing robot can be obtained, and then the initial location of the warehousing robot in the semantic map can be obtained.

Implementation B3: The warehousing robot is further equipped with an odometer. During the movement of the warehousing robot, the odometer can acquire data such as the moving distance and angle of the warehousing robot, which are referred to as odometer data for short. Based on the pulse variation of a photoelectric encoder in a sampling period, the odometer calculates the variation of the moving distance and orientation angle of the warehousing robot relative to the ground, so as to calculate the initial location of the warehousing robot in the semantic map.

Figure 3:
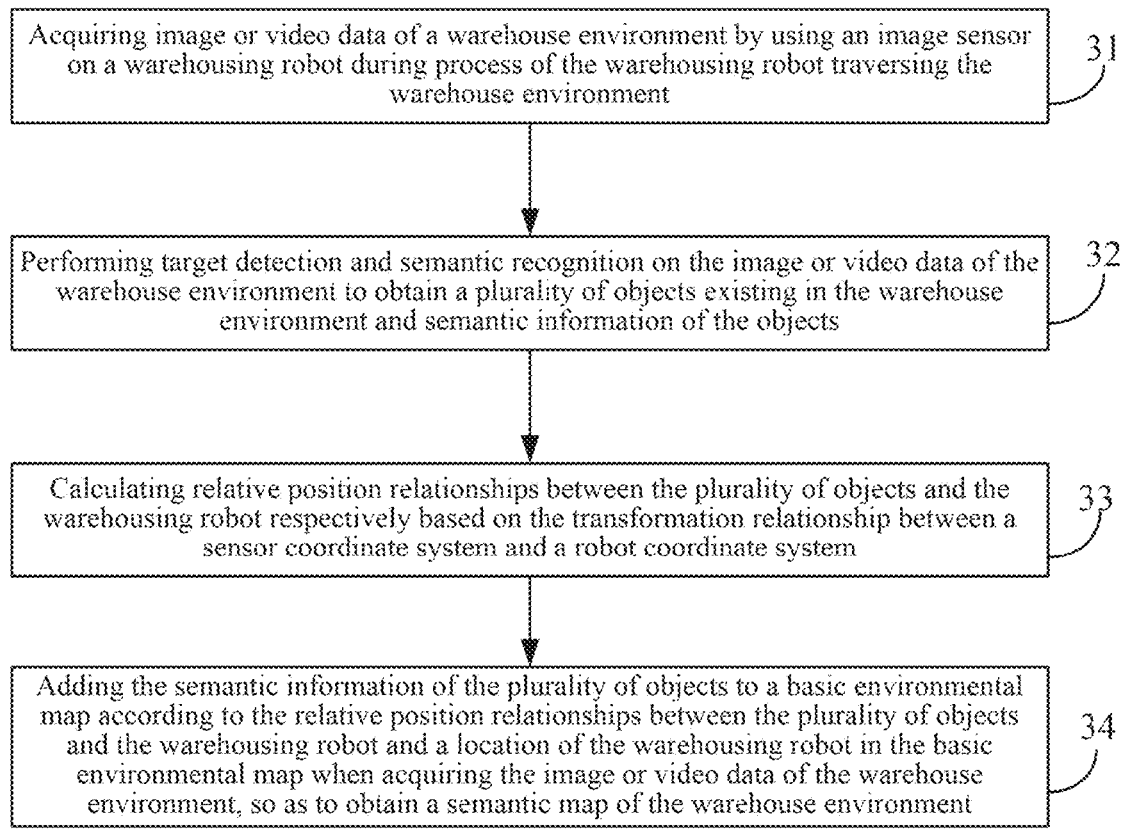
FIG. 3 is a flowchart of a method for constructing a semantic map provided by an exemplary embodiment of the application.

In the above embodiment, when determining the location of the warehousing robot in the semantic map, the semantic map of the warehouse environment where the warehousing robot is located is needed. On this basis, an embodiment of the application further provides a flowchart of a method for constructing a semantic map. As shown in FIG. 3, the method comprises:

31. acquiring image or video data of a warehouse environment by using an image sensor on a warehousing robot during process of the warehousing robot traversing the warehouse environment;
32. performing target detection and semantic recognition on the image or video data of the warehouse environment to obtain a plurality of objects existing in the warehouse environment and semantic information of the objects;

33. calculating relative position relationships between the plurality of objects and the warehousing robot respectively based on the transformation relationship between a sensor coordinate system and a robot coordinate system; and 34. adding the semantic information of the plurality of objects to a basic environmental map according to the relative position relationships between the plurality of objects and the warehousing robot and a location of the warehousing robot in the basic environmental map when acquiring the image or video data of the warehouse environment, so as to obtain a semantic map of the warehouse environment.

In this embodiment, the warehousing robot needs to traverse the whole warehouse environment to construct a semantic map corresponding to the warehouse environment. In the process of traversing the whole warehouse environment, the image sensor can be used to acquire the image or video data of the whole warehouse environment, and the acquired image or video data can be subjected to target detection and semantic recognition to obtain a plurality of objects existing in the warehouse environment and semantic information of the objects. Here, the detailed implementation process of obtaining the plurality of objects existing in the warehouse environment and the semantic information of the objects can be seen in the aforementioned embodiments, and will not be repeated here.

In an alternative embodiment, in the process of traversing the whole warehouse environment, a basic environmental map of the warehouse environment can also be constructed by using the SLAM technology. Further, when acquiring the image or video data of the warehouse environment, the location of the warehousing robot in the basic environmental map can also be determined by using the SLAM technology, wherein the basic environmental map refers to an environmental map constructed by the warehousing robot by using the SLAM technology, for example, it may be a grid map. Compared with the semantic map, the basic environmental map is an environmental map without semantic information. Of course, it should be noted that the basic environmental map and the semantic map may be constructed in the same traversal process, or the basic environmental map may be constructed in advance through another traversal process, which is not limited.

After obtaining the plurality of objects existing in the warehouse environment and the semantic information of the objects, if the relative position relationship between the plurality of objects and the warehousing robot is known, the locations of the plurality of objects in the semantic map can be determined based on the location of the warehousing robot in the basic environmental map when acquiring the image or video data of the warehouse environment. On this basis, in this embodiment, after the image sensor acquires the image or video data of the warehouse environment, the position coordinates of the target object can be calculated, and then the relative position relationship between the target object and the warehousing robot can be calculated based on the position coordinates of the target object. Detailed contents can be seen in the previous embodiments, and will not be repeated here.

Further, according to the relative position relationship between each object and the warehousing robot and the location of the warehousing robot in the basic environmental map when acquiring the image or video data of the warehouse environment, the locations of the plurality of objects in the basic environmental map are obtained. Finally, the plurality of objects in the warehouse environment and the semantic information of the objects are added to the basic environmental map to obtain the semantic map.

It should be noted that the execution subject of each step of the method provided in the above embodiment can be the same device, or the method can also be executed by different devices. For example, the execution subject of steps 11 to 13 can be device A; for another example, the execution subject of steps 11 and 12 can be device A, and the execution subject of step 13 can be device B.

In addition, some processes described in the above embodiments and the attached drawings contain a plurality of operations that appear in a specific order, but it should be clearly understood that these operations can be executed without following the order in which they appear herein or can be executed concurrently. The serial numbers of the operations, such as 11 and 12, are only used to distinguish different operations, and the serial numbers themselves do not represent any execution order. In addition, these processes may include more or fewer operations, and these operations may be performed sequentially or concurrently. It should be noted that words likes "first" and "second" herein are used to distinguish different messages, devices, modules, or the like, and do not represent the sequential order, and "first" and "second" are not necessarily of different types.

Figure 4:
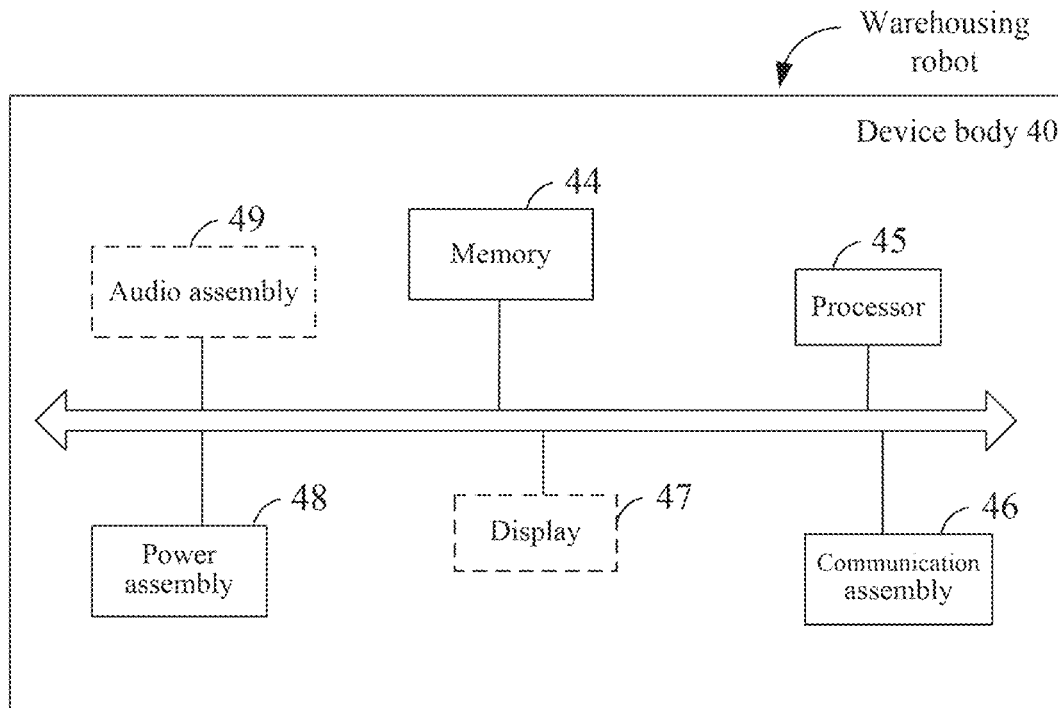
FIG. 4 is a structural diagram of a warehousing robot provided by an exemplary embodiment of the application.

FIG. 4 is a structural diagram of a warehousing robot provided by an exemplary embodiment of the application. As shown in FIG. 4, the warehousing robot comprises a device body 40, on which a memory 44 and a processor 45 are provided.

The memory 44 is used for storing computer programs and can be configured to store various other data to support the operation on the warehousing robot. Examples of such data include instructions for any application or method running on the warehousing robot, contact data, phone book data, messages, pictures, videos, or the like The memory 44 may be implemented by any type of volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

The processor 45 is coupled to the memory 44 and used for executing the computer programs in the memory 44 to: acquire an image or video data of a surrounding warehouse environment by using an image sensor on a warehousing robot during movement of the warehousing robot; perform target detection and semantic recognition on the image or video data of the surrounding warehouse environment to obtain target objects in the surrounding warehouse environment and semantic information of the target objects; calculate a relative position relationship between each target object and the warehousing robot based on a transformation relationship between a sensor coordinate system and a robot coordinate system; and determine a location of the warehousing robot in a semantic map according to the relative position relationship between each target object and the warehousing robot and the semantic information of each target object, wherein the semantic map comprises a plurality of objects in the warehouse environment and semantic information of the objects.

In an alternative embodiment, when calculating the relative position relationship between each target object and the warehousing robot based on the transformation relationship between the sensor coordinate system and the robot coordinate system, the processor 45 is specifically configured to: calculate the three-dimensional coordinates of the pixels on the target object in the sensor coordinate system; transform the three-dimensional coordinates of the pixels on the target object from the sensor coordinate system to the robot coordinate system based on the transformation relationship between the sensor coordinate system and the robot coordinate system; and calculate the relative position relationship between the target object and the warehousing robot according to the three-dimensional coordinates of the pixels on the target object in the robot coordinate system.

In an alternative embodiment, the image sensor is a monocular camera and the target object is an object intersecting the ground plane or an object located on the ground plane, and then the processor 45, when calculating the three-dimensional coordinates of the pixels on the target object in the sensor coordinate system, is specifically configured to: calculate the three-dimensional coordinates, on the ground plane, of the pixels intersecting the ground plane on the target object in combination with a photographic geometry of the monocular camera. Alternatively, the image sensor is a binocular camera, and then the processor 45, when calculating the three-dimensional coordinates of the pixels on the target object in the sensor coordinate system, is specifically configured to: calculate the three-dimensional coordinates of the pixels on the target object in the sensor coordinate system by using a binocular stereo matching algorithm. Alternatively, the image sensor is an RGBD camera, and then the processor 45, when calculating the three-dimensional coordinates of the pixels on the target object in the sensor coordinate system, is specifically configured to: calculate the three-dimensional coordinates of the pixels on the target object in the sensor coordinate system according to the matching relationship between the acquired RGB image and depth image containing the target object.

In an alternative embodiment, the processor 45, when determining the location of the warehousing robot in the semantic map according to the relative position relationship between each target object and the warehousing robot and the semantic information of the target object, is specifically configured to: determine the location of the target object in the semantic map according to the semantic information of the target object; and determine the location of the warehousing robot in the semantic map according to the relative position relationship between the target object and the warehousing robot and the location of the target object in the semantic map.

In an alternative embodiment, the processor 45, when determining the location of the target object in the semantic map according to the semantic information of the target object, is specifically configured to: calculate the initial location of the warehousing robot in the semantic map based on other sensor data on the warehousing robot; and search for the location of the target object around the initial location in the semantic map according to the semantic information of the target object.

In an alternative embodiment, the processor 45, when calculating the initial location of the warehousing robot in the semantic map based on other sensor data on the warehousing robot, is specifically configured to: calculate the initial location of the warehousing robot in the semantic map based on at least one of laser sensor data, IMU data and odometer data on the warehousing robot.

In an alternative embodiment, the processor 45 is further configured to: acquire image or video data of a warehouse environment by using an image sensor on a warehousing robot during the process of the warehousing robot traversing the warehouse environment; perform target detection and semantic recognition on the image or video data of the warehouse environment to obtain a plurality of objects existing in the warehouse environment and semantic information of the objects; calculate the relative position relationships between the plurality of objects and the warehousing robot respectively based on the transformation relationship between a sensor coordinate system and a robot coordinate system; and add the semantic information of the plurality of objects to a basic environmental map according to the relative position relationships between the plurality of objects and the warehousing robot and a location of the warehousing robot in the basic environmental map when acquiring the image or video data of the warehouse environment, so as to obtain a semantic map of the warehouse environment.

In an alternative embodiment, the processor 45, when acquiring the image or video data of the warehouse environment, is also configured to: construct a basic environmental map of the warehouse environment by using the SLAM technology, and determine the location of the warehousing robot in the basic environmental map when acquiring the image or video data of the warehouse environment.

In an alternative embodiment, the target objects at least comprise: shelves, intersecting lines between the shelves and a ground plane, and intersections formed by the shelves.

In an alternative embodiment, the target objects further comprise: at least one of shelf bases, fire hydrants and escape signs.

Further, as shown in FIG. 4, the warehousing robot further comprises a communication assembly 46, a display 47, a power assembly 48, an audio assembly 49 and other assemblies. Only some assemblies are shown schematically in FIG. 4, but it does not mean that the warehousing robot only comprises the assemblies shown in FIG. 4. It should be noted that the assemblies in the dotted boxes in FIG. 4 are optional assemblies, but not mandatory assemblies, depending on the product modality of the warehousing robot.

Correspondingly, an embodiment of the application further provides a computer-readable storage medium storing computer programs, and when the computer programs are executed, the steps that can be executed by the warehousing robot in the above-mentioned embodiments of the method for locating the warehousing robot and the method for constructing the semantic map can be implemented.

The communication assembly in FIG. 4 is configured to facilitate wired or wireless communication between a device where the communication assembly is located and other devices. The device where the communication assembly is located can access wireless networks based on communication standards, such as WiFi, mobile communication networks such as 2G, 3G, 4G/LTE, 5G, or a combination thereof. In an exemplary embodiment, the communication assembly receives a broadcast signal or broadcast related information from an external broadcast management system via a broadcast channel. In an exemplary embodiment, the communication assembly further comprises a Near Field Communication (NFC) module to facilitate short-range communication. For example, the NFC module can be implemented based on the Radio Frequency Identification (RFID) technology, the Infrared Data Association (IrDA) technology, the Ultra-Wideband (UWB) technology, the Bluetooth (BT) technology and other technologies.

The display in FIG. 4 described above comprises a screen, and the screen may comprise a liquid crystal display (LCD)

and a touch panel (TP). If the screen comprises a touch panel, the screen may be implemented as a touch screen so as to receive an input signal from the user. The touch panel comprises one or more touch sensors to sense touch, sliding, and gestures on the touch panel. The touch sensor may not only sense the boundary of the touch or sliding, but also detect the time length and pressure related to the touch or sliding.

The power assembly in FIG. 4 provides power for various assemblies of a device where the power assembly is located. The power assembly may comprise a power management system, one or more power supplies, and other assemblies associated with generating, managing, and distributing power for the device where the power assembly is located.

The audio assembly in FIG. 4 may be configured to output and/or input audio signals. For example, the audio assembly comprises a microphone (MIC) configured to receive external audio signals when a device where the audio assembly is located is in an operating mode, such as a call mode, a recording mode, and a voice recognition mode. The received audio signals may be further stored in the memory or transmitted via the communication assembly. In some embodiments, the audio assembly further comprises a speaker for outputting the audio signals.

Those skilled in the art will appreciate that the embodiments of the invention may be provided as methods, systems, or computer program products. Therefore, the invention may take the form of a full hardware embodiment, a full software embodiment, or an embodiment combining software and hardware aspects. Further, the application may take the form of a computer program product implemented on one or more computer usable storage media (including but not limited to magnetic disk memory, CD-ROM, optical memory, or the like) having computer usable program code embodied therein.

The application is described with reference to flowcharts and/or block diagrams of the method, device (system), and computer program product according to the embodiments of the application. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing apparatus produce a device for implementing the functions specified in one or more flows in the flowcharts and/or one or more blocks in the block diagrams.

These computer program instructions may also be stored in a computer-readable memory which can direct a computer or other programmable data processing apparatus to function in a particular manner, such that the instructions stored in the computer-readable memory produce an article of manufacture including an instruction device which implements the functions specified in one or more flows in the flowcharts and/or one or more blocks in the block diagrams.

These computer program instructions may also be loaded onto a computer or other programmable data processing apparatus such that a series of operational steps are performed on the computer or other programmable data processing apparatus to produce a computer implemented process, such that the instructions executed on the computer or other programmable apparatus provide steps for implementing the functions specified in one or more flows in the flowcharts and/or one or more blocks in the block diagrams.

In a typical configuration, a computing device comprises one or more processors (CPU), an input/output interface, a network interface, and a memory.

The memory may be a non-permanent memory, a random access memory (RAM) and/or a nonvolatile memory in computer-readable media, such as read-only memory (ROM) or flash RAM. The memory is an example of a computer-readable medium.

Computer-readable media, including permanent and non-permanent, removable and non-removable media, can store information by any method or technology. Information may be computer-readable instructions, data structures, modules of programs or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape and magnetic disk storage or other magnetic storage devices or any other non-transmission media which can be used to store information that can be accessed by computing devices. According to the definition herein, computer-readable media do not include temporary computer-readable media (transitory media), such as modulated data signals and carrier waves.

It should also be noted that terms such as "comprise", "include" or any variation thereof are intended to cover a non-exclusive inclusion, such that a process, method, article, or apparatus that includes a series of elements not only includes those listed elements but also includes other elements not expressly listed or also includes inherent elements of such a process, method, article, or apparatus. Without further limitation, an element defined by the statement "includes a . . . " does not exclude the presence of another identical element in a process, method, article or device that includes the element.

The above are only embodiments of this application, and are not used to limit this application. For those skilled in the art, this application can be modified and varied. Any modification, equivalent substitution, improvement, or the like made within the spirit and principle of this application shall be included in the scope of the claims of this application.

What is claimed is:

1. A method for locating a warehousing robot, comprising:
    acquiring an image or video data of a surrounding warehouse environment by using an image sensor on a warehousing robot during movement of the warehousing robot;
    performing target detection and semantic recognition on the image or video data of the surrounding warehouse environment to obtain target objects in the surrounding warehouse environment and semantic information of the target objects;
    calculating a relative position relationship between each target object and the warehousing robot based on a transformation relationship between a sensor coordinate system and a robot coordinate system; and
    determining a location of the warehousing robot in a semantic map according to the relative position relationship between each target object and the warehousing robot and the semantic information of each target object, wherein the semantic map comprises a plurality of objects in the warehouse environment and semantic information of the objects.

2. The method according to claim 1, wherein calculating the relative position relationship between each target object and the warehousing robot based on the transformation relationship between a sensor coordinate system and a robot coordinate system comprises:
calculating three-dimensional coordinates of pixels on the target object in the sensor coordinate system;
transforming the three-dimensional coordinates of the pixels on the target object from the sensor coordinate system to the robot coordinate system based on the transformation relationship between the sensor coordinate system and the robot coordinate system; and
calculating the relative position relationship between the target object and the warehousing robot according to the three-dimensional coordinates of the pixels on the target object in the robot coordinate system.

3. The method according to claim 2, wherein
the image sensor is a monocular camera and the target object is an object intersecting a ground plane or an object located on the ground plane, and calculating the three-dimensional coordinates of the pixels on the target object in the sensor coordinate system comprises: calculating the three-dimensional coordinates, on the ground plane, of the pixels intersecting the ground plane on the target object in combination with a photographic geometry of the monocular camera; or
the image sensor is a binocular camera, and calculating the three-dimensional coordinates of the pixels on the target object in the sensor coordinate system comprises: calculating the three-dimensional coordinates of the pixels on the target object in the sensor coordinate system by using a binocular stereo matching algorithm; or
the image sensor is an RGBD camera, and calculating the three-dimensional coordinates of the pixels on the target object in the sensor coordinate system comprises: calculating the three-dimensional coordinates of the pixels on the target object in the sensor coordinate system according to the matching relationship between an acquired RGB image containing the target object and a depth image containing the target object.

4. The method according to claim 1, wherein determining the location of the warehousing robot in a semantic map according to the relative position relationship between each target object and the warehousing robot and the semantic information of each target object comprises:
determining a location of the target object in the semantic map according to the semantic information of the target object; and
determining the location of the warehousing robot in the semantic map according to the relative position relationship between the target object and the warehousing robot and the location of the target object in the semantic map.

5. The method according to claim 4, wherein determining the location of the target object in the semantic map according to the semantic information of the target object comprises:
calculating an initial location of the warehousing robot in the semantic map based on other sensor data on the warehousing robot; and
searching for the location of the target object around the initial location in the semantic map according to the semantic information of the target object.

6. The method according to claim 5, wherein calculating the initial location of the warehousing robot in the semantic map based on other sensor data on the warehousing robot comprises:
calculating the initial location of the warehousing robot in the semantic map based on at least one of laser sensor data, IMU data and odometer data on the warehousing robot.

7. The method according to claim 1, further comprising:
acquiring the image or video data of the warehouse environment by using the image sensor on the warehousing robot during process of the warehousing robot traversing the warehouse environment;
performing target detection and semantic recognition on the image or video data of the warehouse environment to obtain a plurality of objects existing in the warehouse environment and semantic information of the objects;
calculating relative position relationships between the plurality of objects and the warehousing robot respectively based on the transformation relationship between the sensor coordinate system and the robot coordinate system; and
adding the semantic information of the plurality of objects to a basic environmental map according to the relative position relationships between the plurality of objects and the warehousing robot and a location of the warehousing robot in the basic environmental map when acquiring the image or video data of the warehouse environment, so as to obtain the semantic map of the warehouse environment.

8. The method according to claim 7, wherein when acquiring the image or video data of the warehouse environment, the method further comprises:
constructing the basic environmental map of the warehouse environment by using the SLAM technology, and determining the location of the warehousing robot in the basic environmental map when acquiring the image or video data of the warehouse environment.

9. The method according to claim 1, wherein the target objects at least comprise: shelves, intersecting lines between the shelves and a ground plane, and intersections formed by the shelves.

10. The method according to claim 9, wherein the target objects further comprise: at least one of shelf bases, fire hydrants and escape signs.

11. A method for constructing a semantic map, comprising:
acquiring an image or video data of a warehouse environment by using an image sensor on a warehousing robot during process of the warehousing robot traversing the warehouse environment;
performing target detection and semantic recognition on the image or video data of the warehouse environment to obtain a plurality of objects existing in the warehouse environment and semantic information of the objects;
calculating relative position relationships between the plurality of objects and the warehousing robot respectively based on a transformation relationship between a sensor coordinate system and a robot coordinate system; and
adding the semantic information of the plurality of objects to a basic environmental map according to the relative position relationships between the plurality of objects and the warehousing robot and a location of the warehousing robot in the basic environmental map when acquiring the image or video data of the warehouse environment, so as to obtain the semantic map of the warehouse environment.

12. A warehousing robot, comprising a device body including:
   a memory for storing computer programs; and
   a processor coupled to the memory and used for executing the computer programs to: acquire an image or video data of a surrounding warehouse environment by using an image sensor on a warehousing robot during movement of the warehousing robot; perform target detection and semantic recognition on the image or video data of the surrounding warehouse environment to obtain target objects in the surrounding warehouse environment and semantic information of the target objects; calculate a relative position relationship between each target object and the warehousing robot based on a transformation relationship between a sensor coordinate system and a robot coordinate system; and determine a location of the warehousing robot in a semantic map according to the relative position relationship between each target object and the warehousing robot and the semantic information of each target object, wherein the semantic map comprises a plurality of objects in the warehouse environment and semantic information of the objects.

13. The warehousing robot according to claim 12, wherein the processor, when calculating the relative position relationship between each target object and the warehousing robot based on the transformation relationship between a sensor coordinate system and a robot coordinate system, is specifically configured to:
   calculate three-dimensional coordinates of pixels on the target object in the sensor coordinate system;
   transform the three-dimensional coordinates of the pixels on the target object from the sensor coordinate system to the robot coordinate system based on the transformation relationship between the sensor coordinate system and the robot coordinate system; and
   calculate the relative position relationship between the target object and the warehousing robot according to the three-dimensional coordinates of the pixels on the target object in the robot coordinate system.

14. The warehousing robot according to claim 12, wherein the processor, when determining the location of the warehousing robot in a semantic map according to the relative position relationship between each target object and the warehousing robot and the semantic information of each target object, is specifically configured to:
   determine a location of the target object in the semantic map according to the semantic information of the target object; and
   determine the location of the warehousing robot in the semantic map according to the relative position relationship between the target object and the warehousing robot and the location of the target object in the semantic map.

15. The warehousing robot according to claim 12, wherein the processor is further configured to:
   acquire the image or video data of the warehouse environment by using the image sensor on the warehousing robot during process of the warehousing robot traversing the warehouse environment;
   perform target detection and semantic recognition on the image or video data of the warehouse environment to obtain a plurality of objects existing in the warehouse environment and semantic information of the objects;
   calculate relative position relationships between the plurality of objects and the warehousing robot respectively based on the transformation relationship between the sensor coordinate system and the robot coordinate system; and
   add the semantic information of the plurality of objects to a basic environmental map according to the relative position relationships between the plurality of objects and the warehousing robot and a location of the warehousing robot in the basic environmental map when acquiring the image or video data of the warehouse environment, so as to obtain a semantic map of the warehouse environment.

* * * * *